United States Patent
Kashima et al.

(10) Patent No.: US 9,606,352 B2
(45) Date of Patent: Mar. 28, 2017

(54) CAMERA MODULE

(71) Applicant: SMK Corporation, Tokyo (JP)

(72) Inventors: Masayoshi Kashima, Tokyo (JP); Nobuyuki Mano, Tokyo (JP); Taku Akaiwa, Kanagawa (JP)

(73) Assignee: SMK Corporation, Tokyo (JP)

( * ) Notice: Subject to any disclaimer, the term of this patent is extended or adjusted under 35 U.S.C. 154(b) by 0 days.

(21) Appl. No.: 14/799,580

(22) Filed: Jul. 15, 2015

(65) Prior Publication Data
US 2016/0062110 A1    Mar. 3, 2016

(30) Foreign Application Priority Data

Aug. 29, 2014 (JP) ................. 2014-175501

(51) Int. Cl.
G02B 7/02 (2006.01)
G02B 27/00 (2006.01)
(Continued)

(52) U.S. Cl.
CPC ......... *G02B 27/0006* (2013.01); *G02B 7/021* (2013.01); *G02B 7/022* (2013.01);
(Continued)

(58) Field of Classification Search
CPC .... G02B 27/0006; G02B 7/021; G02B 7/022; G02B 7/026; G02B 7/028; G02B 13/001; H04N 5/2254
(Continued)

(56) References Cited

U.S. PATENT DOCUMENTS 2,526,156 A * 10/1950 Quale ................... A41D 27/24
                                                   112/429
3,687,797 A *  8/1972 Wideman ............... A41D 31/02
                                                   156/229
(Continued)

FOREIGN PATENT DOCUMENTS

JP    2005-217546    *  8/2005  ............ H04N 5/225
JP    2005-217546 A     8/2005
(Continued)

OTHER PUBLICATIONS

Office Action issued for counterpart Japanese Application 2014-175501, issued by Japan Patent Office on Aug. 22, 2016.

*Primary Examiner* — Frank Font

(57) ABSTRACT

A camera module is provided which has a simple structure, can be easily assembled, can avoid the adverse effects of dust on imaging, and can promote heat dissipation of an imaging device. In a camera module, which includes a lens unit that has a cylindrical thread portion, a flat plate-shaped imaging device that is mounted on a printed wiring board, and a holder that holds the lens unit and the printed wiring board with maintaining the predetermined positional relationship therebetween, an imaging field of the imaging device is disposed in a space tightly closed by a first spacer that is made into a ring shape made of an elastic material the surface of which is an adhesive surface, and the adhesive surface is exposed at least in an inner peripheral wall of the first spacer. The first spacer may be made of a material that further has favorable thermal conductivity.

7 Claims, 10 Drawing Sheets

(51) Int. Cl.
*H04N 5/225* (2006.01)
*G02B 13/00* (2006.01)

(52) U.S. Cl.
CPC ............ *G02B 7/026* (2013.01); *G02B 7/028* (2013.01); *H04N 5/2254* (2013.01); *G02B 13/001* (2013.01)

(58) Field of Classification Search
USPC .......... 359/503, 512, 513, 819, 820; 396/25, 396/535; 250/216, 237 R, 238, 239; 348/335, 340, 373, 374; 257/433, 434
See application file for complete search history.

(56) References Cited

U.S. PATENT DOCUMENTS

| | | | | |
|---|---|---|---|---|
| 5,923,032 | A * | 7/1999 | Carlson | G01D 5/34 250/231.13 |
| 7,391,466 | B2 * | 6/2008 | Machida | G03B 17/00 250/239 |
| 8,072,538 | B2 * | 12/2011 | Higuchi | G02B 7/025 348/335 |
| 8,288,710 | B2 * | 10/2012 | Tsukamoto | H04N 5/2257 250/239 |
| 8,457,487 | B2 * | 6/2013 | Zhang | G03B 17/02 348/340 |
| 2003/0203532 | A1 * | 10/2003 | Misawa | H04N 5/2253 438/89 |
| 2005/0248684 | A1 * | 11/2005 | Machida | H04N 5/2257 348/373 |
| 2006/0278820 | A1 * | 12/2006 | Senba | H01L 23/057 250/239 |
| 2007/0031137 | A1 * | 2/2007 | Bogdan | G02B 7/021 396/114 |
| 2007/0229702 | A1 * | 10/2007 | Shirono | G02B 7/102 348/374 |
| 2009/0219433 | A1 * | 9/2009 | Higuchi | G02B 7/025 348/340 |
| 2010/0019134 | A1 * | 1/2010 | Tsukamoto | H04N 5/2257 250/216 |
| 2010/0025792 | A1 * | 2/2010 | Yamada | G02B 13/001 257/432 |
| 2011/0221017 | A1 * | 9/2011 | Takahashi | C08F 290/064 257/431 |
| 2013/0045002 | A1 * | 2/2013 | Zhang | G03B 17/02 396/429 |

FOREIGN PATENT DOCUMENTS

| | | |
|---|---|---|
| JP | 2007-325149 A | 12/2007 |
| JP | 2008-98367 A | 4/2008 |
| JP | 2009-044541 A | 2/2009 |
| JP | 2010-278515 A | 12/2010 |
| JP | 2012-19422 A | 1/2012 |
| JP | 2012-119795 A | 6/2012 |
| JP | 2013-76944 A | 4/2013 |

* cited by examiner

CAMERA MODULE

CROSS REFERENCE TO RELATED APPLICATION

The contents of the following Japanese patent application are incorporated herein by reference,
NO. 2014-175501 filed on Aug. 29, 2014.

Field

The present invention relates to a camera module, and more specifically, relates to a camera module having a lens unit, an imaging device, and a holder.

Background

So-called view monitor systems have come into widespread use in which imaging means is installed in the rear or the like of a vehicle and captured images are displayed in display means installed inside the vehicle. As the imaging means for the view monitor systems, camera modules are widely used.

Recently, there are growing demands for increase in the performance of the view monitor systems, such as improvement in image quality and quick display response. To meet these demands, it is necessary to increase the number of pixels of an imaging device provided in the camera modules and the speed of an image data processing circuit in the camera modules. This causes increase in a signal processing load of internal elements, and hence heat produced by the elements necessarily grows. Especially, since increase in the temperature of the imaging device degrades the image quality, it is required to take measures against the heat produced during the operation of the imaging device.

For example, Patent Literature 1 discloses an example of the measures against the heat produced by the imaging device in such a camera module (see FIG. 9 of the subject application). In the camera module disclosed in Patent Literature 1, an adhesive resin 160 is charged into (or a resin film is pasted in) a gap formed between a solid-state imaging device 140 and a flexible printed board 150 so as to form a heat dissipation path leading from the solid-state image sensor 140 to the flexible printed board 150, for the purpose of improving a heat dissipation effect of an imaging module.

On the other hand, there has been a conventional problem of measures against dust that could affect imaging by the camera modules. For example, Patent Literature 2 discloses a technique for preventing a failure in a camera module owing to dust, in which a double-sided adhesive tape 400 is attached to at least one of a peripheral wall inside a package of an image sensor 200 and a peripheral wall of a holder 300 outside the package of the image sensor 200, and then the camera module is subjected to a vibration test with an adhesive surface of the double-sided adhesive tape 400 disposed in a lower position so that the double-sided adhesive tape 400 catches dust d inside the camera module (see FIG. 10 of this application).

CITATION LIST

Patent Literature

Patent Literature 1:Japanese Patent Application Laid-Open No. 2012-119795 (paragraph [0056] and FIG. 2)
Patent Literature 2:Japanese Patent Application Laid-Open No. 2009-44541 (paragraph [0016] and FIG. 2)

SUMMARY

Technical Problem

It is conceivable that the configuration of Patent Literature 2 can effectively catch dust. However, considering the external dimensions of the actual camera module, the size of the double-sided adhesive tape to be attached has to be extremely small. In an assembly process of the camera module, the operation of attaching the small-sized double-sided adhesive tape to the peripheral wall is assumed to be extremely difficult.

In view of the above problems, an object of the present invention is to provide a camera module that has a simple structure, can be easily assembled, and can avoid the adverse effects of dust on imaging. In addition, another object of the present invention is to provide a camera module that can promote heat dissipation of an imaging device.

Solution to Problem

To solve the above-described problems, a camera module according to an aspect of the present invention includes: a lens unit that has a cylindrical thread portion and an optical axis; a flat plate-shaped imaging device that is mounted on a printed wiring board; and a holder that has a cylindrical opening that opens along the optical axis of the lens unit and engages with the thread portion, and holds the lens unit and the printed wiring board while maintaining a predetermined positional relationship between the lens unit and the printed wiring board. The camera module further includes a first spacer that is formed into a ring shape made of an elastic material the surface of which is an adhesive surface, and has a first surface situated on the side of the opening and a second surface situated on the side of the imaging device, the first and second surfaces being parallel with a plane orthogonal to the optical axis of the lens unit. The imaging device has an imaging field thereof that is disposed in a space tightly closed by the first spacer between the holder and the printed wiring board, and the adhesive surface is exposed at least in an inner peripheral wall of the first spacer.

Since the imaging field of the imaging device is disposed in the space tightly closed by the first spacer, which is made of the elastic material into the ring shape, it is possible to prevent dust, which may affect imaging, from getting thereinto from the outside.

Also, the first spacer is made of the material the surface of which serves as the adhesive surface, and the adhesive surface is exposed in the inner peripheral wall of the first spacer. Thus, this adhesive surface effectively catches dust that is produced in the above-described tightly closed space in an assembly process of the camera module or dust that has already existed in the tightly closed space, and therefore it is possible to avoid the adverse effects of the dust on imaging. Since the adhesive surface that the material of the first spacer has as its properties is utilized to catch the dust, it is possible to eliminate the need for attaching a separate material such as a double-sided adhesive tape to catch the dust.

In the camera module, the first spacer may be formed of a material that further has favorable thermal conductivity.

By forming the first spacer from the material having the favorable thermal conductivity, heat produced by the imaging device is dissipated through the first spacer, resulting in a favorable heat dissipation effect.

In the camera module, the holder may have a rim flange continued from an open end of the opening on the side of the imaging device along the plane orthogonal to the optical axis of the lens unit. The first surface may be pasted onto the rim flange throughout the entire circumference with the adhesive surface. The entire surface of the second surface may be made into a slidable surface by impairing adhesion properties of the adhesive surface.

In the first spacer formed into the ring shape, the first surface having the adhesion properties situated on the side of the opening is pasted onto the rim flange throughout the entire circumference, while the second surface situated on the side of the imaging device is brought into contact with the light receiving surface of the imaging device. Thus, a space formed by the lens unit, the inner peripheral wall of the opening, the rim flange, the first spacer, and the imaging device is tightly closed. The imaging field of the imaging device is disposed within the tightly closed space to make sure that dust, which may affect imaging, is prevented from getting thereinto from the outside.

If the second surface of the first spacer to be opposed to the imaging device is the adhesive surface, the first spacer could interfere with a shift of the imaging device, when an optical axis alignment operation is performed in the assembly process of the camera module to adjust the positional relationship between the imaging field of the imaging device and the optical axis of the lens unit. Therefore, the second surface of the first spacer is made into the slidable surface, in which the adhesion properties of the adhesive surface are impaired by, for example, pasting a thin film thereon, to prevent the interference in the optical axis alignment operation.

Moreover, when the first spacer is made of the material having the favorable thermal conductivity, the first spacer connects the imaging device to the holder as a heat dissipation path, so that heat produced by the imaging device is guided to the holder through the first spacer. As a result, since the heat produced by the imaging device is dissipated from not only the first spacer but also the holder, a high heat dissipation effect can be obtained.

In the camera module, the slidable surface may be in contact with the light receiving surface of the imaging device with an elastic force throughout the entire circumference.

The first spacer is formed of the elastic material so as to have a thickness slightly thicker than the distance between the rim flange and the light receiving surface of the imaging device. Thus, when the printed wiring board is attached to the holder, the first spacer is elastically deformed and moderately compressed. As a result, the slidable surface of the first spacer is in contact with the light receiving surface of the imaging device with the elastic force. This allows tight closeness between the first spacer and the light receiving surface of the imaging device to be achieved, and therefore it is possible to reliably prevent dust from getting through this portion from the outside.

The camera module may further include a second spacer that is formed into a shape surrounding the imaging device. The second spacer may be pasted onto a mount surface of the printed wiring board on which the imaging device is mounted. The second spacer may have a height from the mount surface of the printed wiring board to a surface opposed to the rim flange with the height being approximately the same as the height of the imaging device. The slidable surface may be in contact with the second spacer with an elastic force throughout the entire circumference.

The imaging device is enclosed with the second spacer formed into the shape corresponding to the external dimensions of the imaging device, and the slidable surface of the first spacer is brought into contact with the second spacer throughout the entire circumference. Thus, the space formed by the lens unit, the inner peripheral wall of the opening, the rim flange, the first spacer, the second spacer, and the imaging device is tightly closed. Since the imaging field of the imaging device is disposed in the tightly closed space, it is possible to reliably prevent dust, which may affect imaging, from getting thereinto from the outside. The second spacer corresponding to the external dimensions of the imaging device is preferably provided when the imaging device is relatively small in size.

In the camera module, the first spacer may have an inside diameter smaller than the diameter of the opening.

Since the inside diameter of the first spacer is made smaller than the diameter of the opening, an inner circumferential part of the first spacer protrudes inwardly in a radial direction of the opening in the rim flange. The protruding part of the first spacer into the opening is an adhesive surface. Thus, the protruding adhesive surface catches dust that is produced in the above-described tightly closed space in the assembly process of the camera module or dust that has already existed in the tightly closed space. In particular, when dust that is produced by screwing the thread portion of the lens unit into the opening of the holder falls by its self-weight, the dust can be caught very effectively because the dust falls to the position of the adhesive surface. As a result, it is possible to avoid the adverse effects of the dust on imaging. By taking advantage of the adhesive surface that the material of the first spacer has as its properties to catch the dust, there is no need for attaching a separate adhesive surface to catch the dust.

Also, in the camera module, the first surface may be made into a slidable surface in which the adhesion properties of the adhesive surface are impaired throughout the entire surface, and be in contact with an end surface of the thread portion with an elastic force throughout the entire circumference. The second surface may be pasted onto the light receiving surface of the imaging device with the adhesive surface throughout the entire circumference.

In the camera module in which the end surface of the thread portion of the lens unit protrudes from the rim flange of the holder to the side of the imaging device, the first spacer that is formed slightly thicker than the distance between the end surface of the thread portion and the light receiving surface of the imaging device is pasted onto the light receiving surface of the imaging device with the second surface being the adhesive surface. Thus, in the state of attaching the printed wiring board to the holder, the first spacer is elastically deformed and moderately compressed. As a result, the slidable surface of the first spacer is in contact with the end surface of the thread portion with an elastic force. By bringing the first surface of the first spacer into contact with the end surface of the thread portion, a space formed by the lens unit, the first spacer, and the imaging device is tightly closed. Since the imaging field of the imaging device is disposed in the tightly closed space, it is possible to reliably prevent dust, which may affect imaging, from getting thereinto from the outside.

The first surface of the first spacer is the slidable surface. Thus, in the assembly process of the camera module, the end surface of the thread portion of the lens unit smoothly slides on the first spacer, when performing the above-described optical axis alignment operation and a focusing operation in which the lens unit is turned and shifted in the direction of the optical axis by using the thread portion, after the first spacer is pasted onto the light receiving surface. Thus, these operations are performed without any problem.

Furthermore, when the first spacer is made of the material having the favorable thermal conductivity, the first spacer connects the imaging device to the lens unit as a heat dissipation path, and hence heat produced by the imaging device is guided to the lens unit and the holder through the first spacer. As a result, the heat produced by the imaging device is dissipated from not only the first spacer but also the lens unit and the holder, and thereby a high heat dissipation effect can be obtained.

The aspect of the present invention realizes a camera module that is easy to assemble and avoids the adverse effects of dust on imaging by catching the dust by an adhesive surface, by means of adopting a simple structure in which a spacer having a surface being the adhesive surface is provided between an imaging device and a holder. In addition, when the spacer is formed from a material having favorable thermal conductivity, it is possible to realize a camera module in which the spacer promotes heat dissipation of the imaging device.

DESCRIPTION OF EMBODIMENTS

Figure 1:
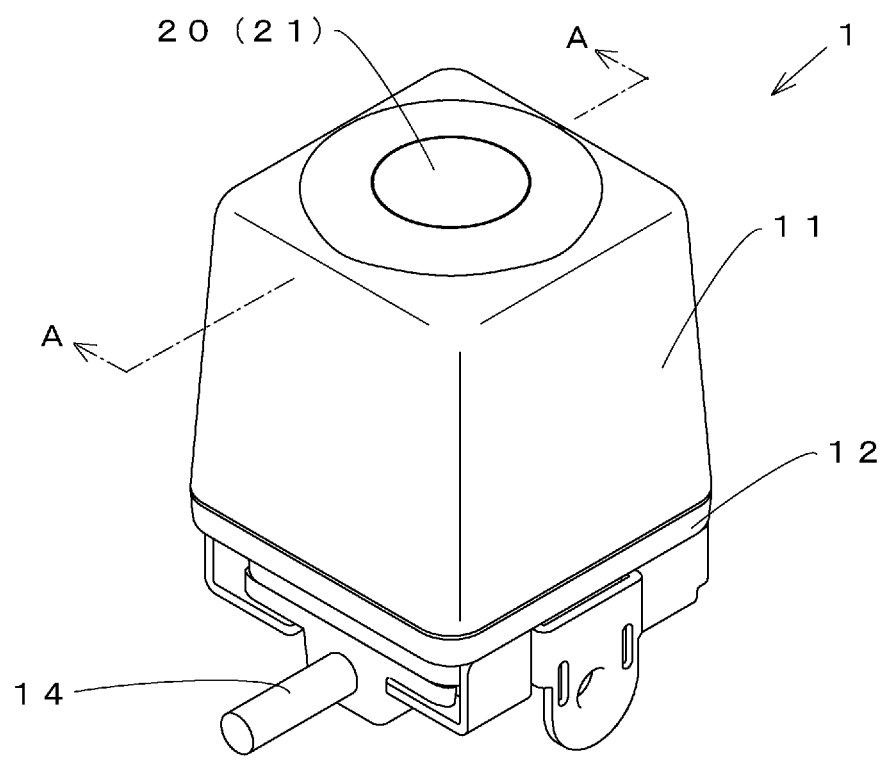
FIG. 1 is an external view of a camera module according to a first embodiment of the present invention.
Figure 2A:
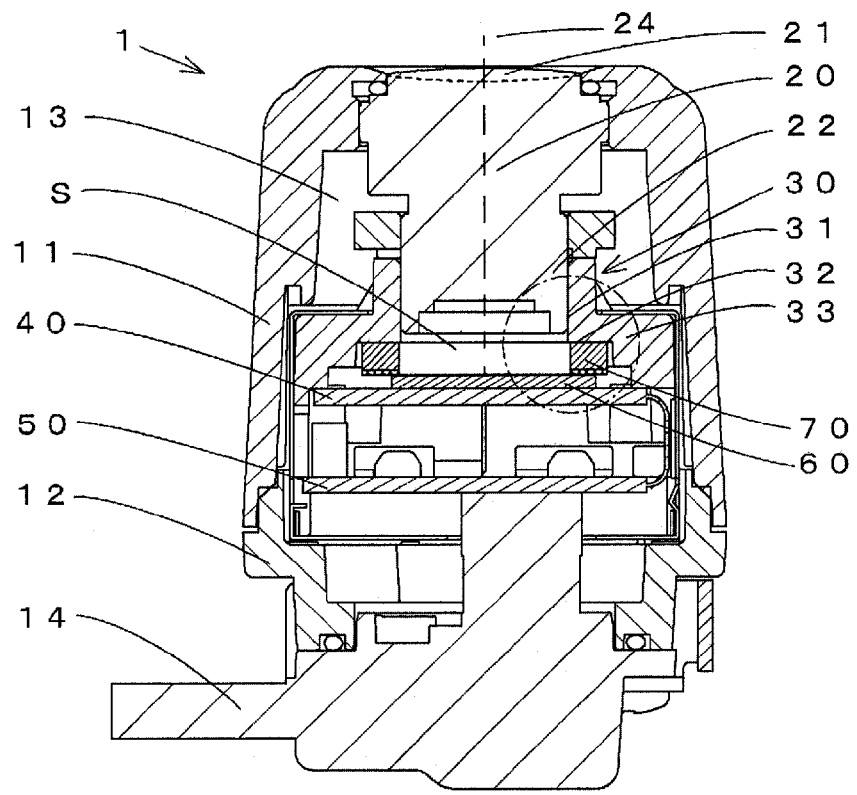
FIG. 2A is a cross-sectional view of a main part of the camera module illustrated in FIG. 1.
Figure 2B:
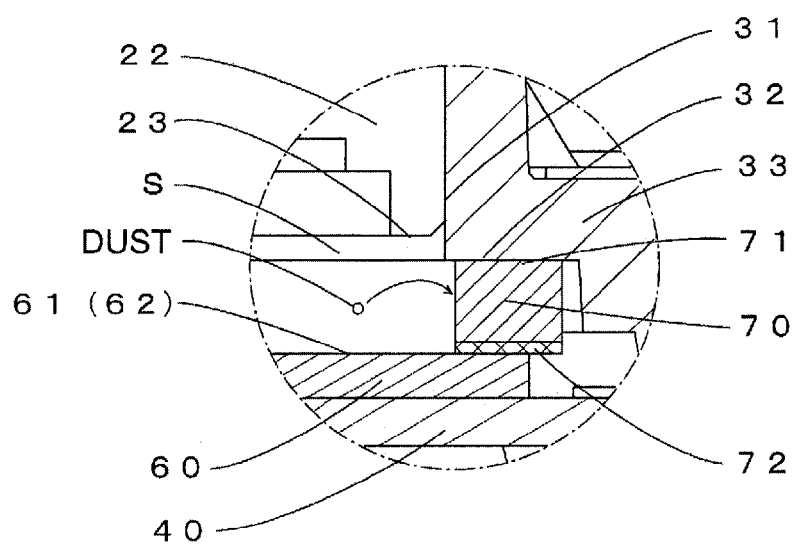
FIG. 2B is a cross-sectional view of a main part of the camera module illustrated in FIG. 1.
Figure 3:
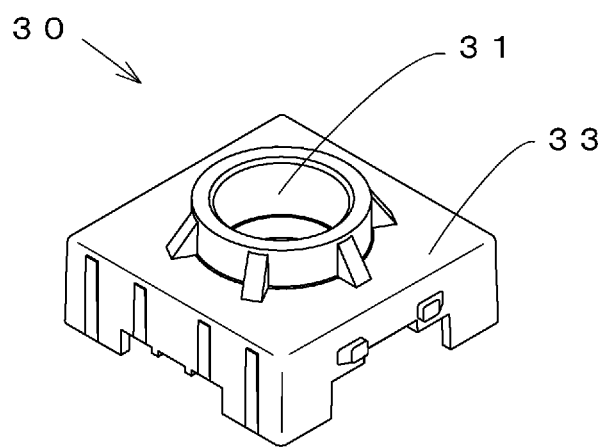
FIG. 3 is an external view of a holder in the camera module illustrated in FIG. 1.
Figure 4A:
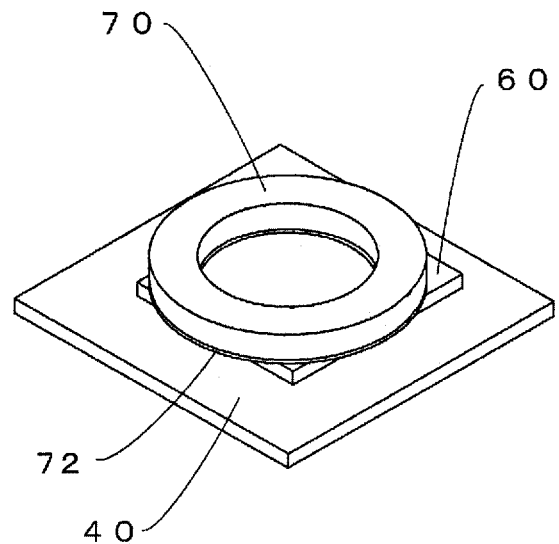
FIG. 4A is a drawing showing the positional relationship between an imaging device and a first spacer in the camera module illustrated in FIG. 1.
Figure 4B:
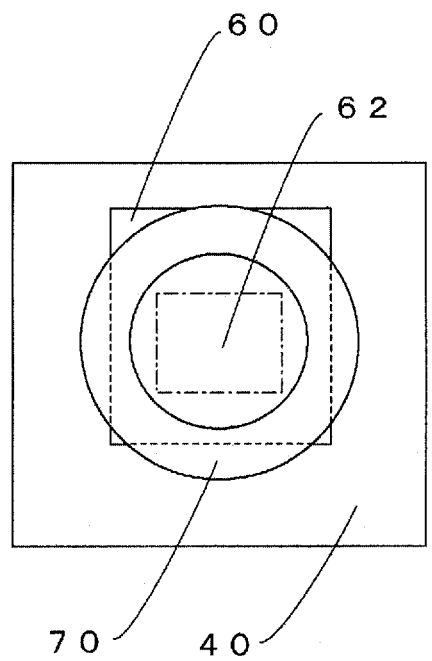
FIG. 4B is a drawing showing the positional relationship between the imaging device and the first spacer in the camera module illustrated in FIG. 1.

A camera module 1 according to a first embodiment of the present invention will be described with reference to FIGS. 1 to 4B. FIG. 1 is a perspective view showing the appearance of the camera module 1 according to the embodiment of the present invention. FIGS. 2A and 2B are cross-sectional views taken along line A-A of the main part of the camera module 1 illustrated in FIG. 1. FIG. 3 is a perspective view showing the appearance of a holder 30 in the camera module 1 illustrated in FIG. 1. FIGS. 4A and 4B are drawings showing the positional relationship among a first printed wiring board 40, an imaging device 60, and a first spacer 70. Note that, FIG. 2B is the enlarged view of a part of FIG. 2A surrounded by a circle indicated by alternate long and short dashed lines.

The camera module 1 used is mainly attached to a body of a not-shown vehicle body of an automobile, for the purpose of capturing images of a blind spot, which is invisible from a driver's seat of the automobile, and informing a driver of the status of the blind spot. Note that, the camera module 1 may be used in a wide variety of applications besides the application described above.

The camera module 1 is in the shape of an approximately rectangular parallelepiped box having a container unit 13 therein. The container unit 13 contains and holds a lens unit 20, the holder 30, the first printed wiring board 40, a second printed wiring board 50, the imaging device 60, and the like as described later on. The exterior of the camera module 1 is composed of a first case 11 on a top side and a second case 12 on a bottom side that are joined in a water-tight manner.

The first case 11 is in the shape of a box having a top surface, four side walls, and a hollow therein that forms the container unit 13. The first case 11 is formed with a circular opening at its top surface to expose the top of the lens unit 20 contained in the container unit 13 therethrough. The opening is in contact with the lens unit 20 in a water-tight manner. An objective lens 21 is disposed in the middle of the exposed lens unit 20. The camera module 1 captures images through the objective lens 21.

The second case 12 is in the shape of a frame having four side walls. The bottom of the first case 11 and the top of the second case 12 are joined to each other in a water-tight manner. A cable 14 is connected to the bottom of the second case 12 via a connector in a water-tight manner. The captured image data is outputted to the outside through the cable 14.

The container unit 13 is composed of a space formed by the first case 11, the second case 12, the lens unit 20, and the cable 14. All of these components are joined to one another in a water-tight manner, so that the container unit 13 is the water-tight space.

The lens unit 20 has a well-known structure in which a plurality of circular convex or concave lenses are held in a tubular lens barrel. The plurality of circular lenses are held concentrically along an optical axis 24, that is, an axial line being a straight line along a perpendicular direction (a vertical direction in FIGS. 2A and 2B) with respect to a light receiving surface 61 of the imaging device 60. Note that, the internal structure of the lens unit 20, such as the number of the lenses to be held and the distances between the lenses, is arbitrary changeable to obtain desired optical properties and is not directly related to the features of the embodiment of the present invention. Thus, the internal structure of the lens unit 20 is simplified in FIG. 2. The bottom of the lens unit 20 is formed with a cylindrical thread portion 22 that is screwed into an opening 31 of the holder 30. A bottom end of the thread portion 22 forms an end surface 23, which is a plane along a plane orthogonal to the optical axis 24 of the lens unit 20. Note that, threads of the thread portion 22 are omitted in FIGS. 2A and 2B.

As illustrated in FIG. 3, the holder 30 made of a synthetic resin has a box unit 33 for containing and holding the first printed wiring board 40, and the opening 31 formed on the top surface of the box unit 33 so as to open in a cylindrical shape along the optical axis 24 of the lens unit 20. The opening 31 is formed with threads, which are engaged with the thread portion 22 of the lens unit 20, in its inner peripheral wall.

The lens unit 20 is held by screwing the thread portion 22 into the opening 31 (the threads formed in the opening 31 are omitted in FIG. 3). Note that, in an assembly process of the camera module 1, appropriately turning the lens unit 20 relative to the holder 30 varies the distance between the imaging device 60 and the lens unit 20, and thereby adjusts a focus. Note that, the holder 30 may be made of a material other than the synthetic resin, such as metal.

Referring to FIGS. 2A and 2B, a rim flange 32 is formed in the periphery of an open end of the above-described opening 31 on the side of the imaging device 60. The rim flange 32 is continued from the inner peripheral wall of the cylindrical opening 31 and along the plane orthogonal to the optical axis, that is, a plane parallel to the imaging device 60. The rim flange 32 is sufficiently flat to allow the first spacer 70 to adhere with an adhesive surface of a first surface 71 of the first spacer 70 described later without having any gap throughout its entire circumference. Note that, in this camera module 1, the end surface 23 of the lens unit 20 is situated above the rim flange 32.

The first printed wiring board 40 is pasted onto and held in the box unit 33 of the holder 30. The box unit 33 has an internal opening size that is slightly larger than the external dimensions of the first printed wiring board 40, when projecting a main surface of the first printed wiring board 40 onto a plane, around the entire periphery. When the first printed wiring board 40 is fixed to the box unit 33 of the holder 30, the first printed wiring board 40 is shifted along the direction of the main surface of the first printed wiring board 40 to perform an optical axis alignment operation by which the center of an imaging field 62 of the imaging device 60 mounted on the first printed wiring board 40 is aligned with the optical axis of the lens unit 20. Then, the first printed wiring board 40 is pasted to the interior of the box unit 33 with an adhesive while maintaining the positional relationship therebetween. As a result, the holder 30 holds the imaging device 60 and the lens unit 20 in the positional relationship in which the center of the imaging field 62 of the imaging device 60 is aligned with the optical axis of the lens unit 20.

The imaging device 60 is a well-known CMOS imaging device in the shape of a rectangular plane. The imaging device 60 is mounted on the first printed wiring board 40 held by the holder 30. The imaging device 60 has the rectangular imaging field 62, as indicated by alternate long and short dashed lines in FIG. 4B, and captures an image in the imaging field 62. As described above, the holder 30 fixes the imaging device 60 and the lens unit 20 in the state of aligning the center of the imaging field 62 with the optical axis of the lens unit 20. Note that, the position of the second printed wiring board 50, which is situated below, may not be strictly determined because no optical element is mounted on the second printed wiring board 50.

The first spacer 70 is formed from a thin plate-shaped material made of acrylic gel having appropriate elasticity and favorable thermal conductivity by stamping into a ring shape. The acrylic gel has adhesion properties by itself, and every surface, such as external surfaces of the acrylic gel formed into an arbitrary shape and a sectional surface when cutting, becomes an adhesive surface having the adhesion properties. Note that, the first spacer 70 may be made of any material having similar properties such as silicone gel, besides the acrylic gel. The favorable thermal conductivity herein means a thermal conductivity higher than the order of 0.1 W/m·K, being an index of thermal conductivity of a general molding material such as a resin. Preferably, a thermal conductivity of the order of 1 W/m·K has an advantage in terms of a heat dissipation effect.

An extremely thin sheet made of PET (polyethylene terephthalate) is pasted onto a second surface 72 of the first spacer 70 situated on the side of the imaging device 60, so that the second surface 72 becomes a slidable surface having no adhesion properties. Since the second surface 72 is made into the slidable surface, the second surface 72 does not interfere with alignment of the first printed wiring board 40 in the above-described optical axis alignment operation. Note that, a technique for obtaining the slidable surface is not limited to pasting of the thin sheet, as described above. The slidable surface may be obtained by another technique, e.g. thinly applying a thermosetting liquid or the like.

The first spacer 70, the first printed wiring board 40, and the imaging device 60 are disposed as illustrated in FIGS. 4A and 4B. Note that, the first spacer 70 is pasted onto the rim flange 32 and fixed to the holder 30 in practice, but FIGS. 4A and 4B illustrate the state in which the first spacer 70 is taken out for the sake of illustrating the relation with the imaging device 60. As illustrated in FIG. 4B, the inside diameter of the first spacer 70 is set so as to surround the imaging field 62 of the imaging device 60. The entire imaging field 62 is disposed and exposed within the first spacer 70. The outside diameter of the first spacer 70 is set slightly larger than the external dimensions of the imaging device 60, when viewed in a plane. The first spacer 70 is in contact with the light receiving surface 61 of the imaging device 60 at least throughout the entire circumference of the first spacer 70, but not necessarily in contact with the entire surface of second surface 72 of the first spacer 70.

The first spacer 70 is formed slightly thicker than the distance between the rim flange 32 and the light receiving surface 61 of the imaging device 60. In the state of pasting and fixing the first printed wiring board 40 onto the box unit 33 of the holder 30, the first spacer 70 is elastically deformed and moderately compressed. Thus, the second surface 72 of the first spacer 70 is in contact with the light receiving surface 61 of the imaging device 60 with an elastic force that acts to try to return to an original shape from the compressed state. As a result, since the space S that is formed by the lens unit 20, the inner peripheral wall of the opening 31, the rim flange 32, the first spacer 70, and the imaging device 60 is tightly closed, it is possible to prevent dust from getting into the space S from the outside. Since the imaging field 62 of the imaging device 60 is disposed within the tightly closed space S, it is possible to avoid the adverse effects of contamination of the dust on imaging.

Also, as illustrated in FIG. 2B, the adhesive surface exposed in the inner peripheral wall of the first spacer 70 effectively catches dust that is produced in the above-described tightly closed space S in the assembly process of the camera module 1 or dust that has already existed in the tightly closed space S, and therefore it is possible to avoid the adverse effects of the dust on imaging. As described above, a simple structure is configured by taking advantage of the adhesive surface that the material of the first spacer 70 has as its properties to catch the dust, and therefore the camera module 1 can be assembled extremely easily, with eliminating the need for attaching a separate member such as a double-sided adhesive tape to catch the dust.

Furthermore, since the first spacer 70 made of the acrylic gel having the favorable thermal conductivity connects the light receiving surface 61 of the imaging device 60 to the holder 30 as a heat dissipation path, heat produced by the imaging device 60 is guided to the holder 30 through the first spacer 70. As a result, the heat produced by the imaging device 60 is dissipated from not only the first spacer 70 but also the holder 30, and thereby a high heat dissipation effect can be obtained.

Figure 5A:
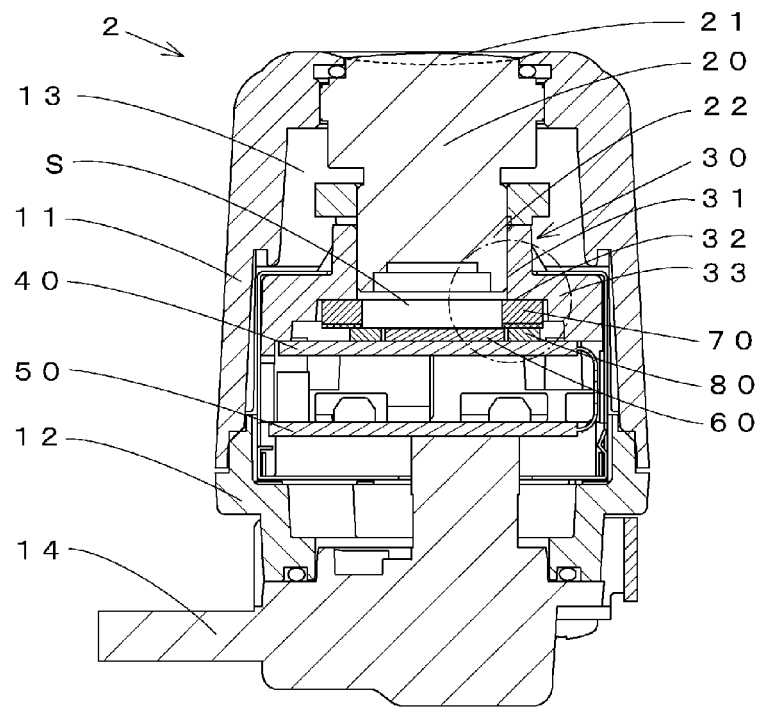
FIG. 5A is a cross-sectional view of a main part of a camera module according to a second embodiment of the present invention.
Figure 5B:
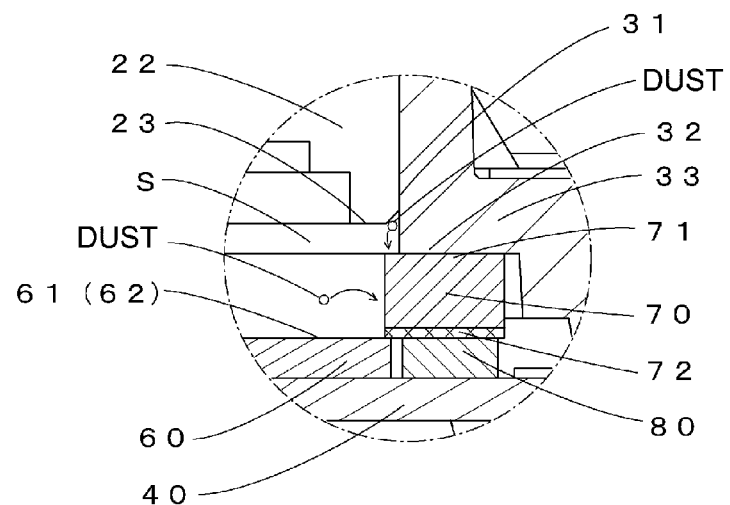
FIG. 5B is a cross-sectional view of a main part of a camera module according to a second embodiment of the present invention.
Figure 6:
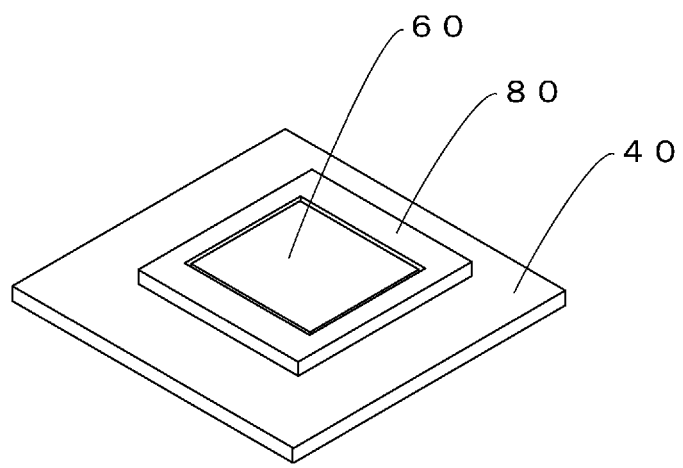
FIG. 6 is a drawing showing an imaging device and a second spacer in the camera module illustrated in FIGS. 5A and 5B.
Figure 7A:
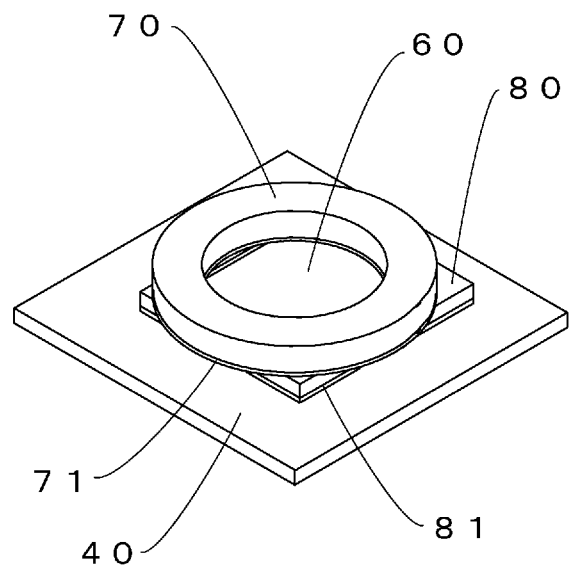
FIG. 7A is a drawing showing the positional relationship among the imaging device, the first spacer, and the second spacer in the camera module illustrated in FIGS. 5A and 5B.
Figure 7B:
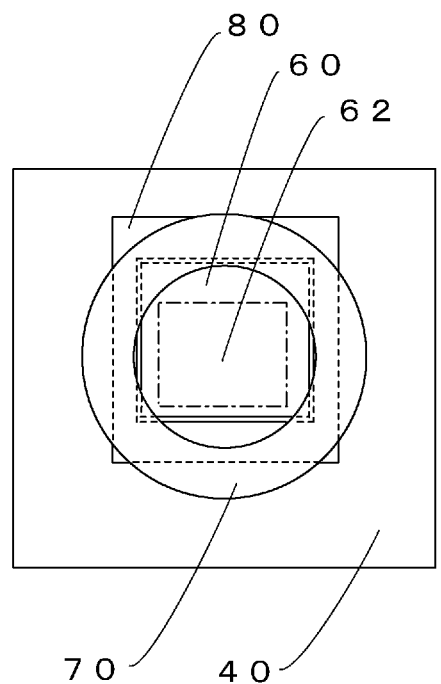
FIG. 7B is a drawing showing the positional relationship among the imaging device, the first spacer, and the second spacer in the camera module illustrated in FIGS. 5A and 5B.

A camera module 2 according to a second embodiment of the present invention will be described with the use of FIGS. 5A to 7B. FIGS. 5A and 5B are cross-sectional views of the camera module 2 according to the second embodiment at the same portion as the line A-A of the camera module 1 illustrated in FIG. 1. FIG. 6 is a perspective view showing the positional relationship among the first printed wiring board 40, the imaging device 60, and a second spacer 80. FIGS. 7A and 7B are drawings showing the positional relationship among the first printed wiring board 40, the imaging device 60, the first spacer 70, and the second spacer 80. FIG. 5B is an enlarged view of a part of FIG. 5A surrounded by a circle indicated by alternate long and short dashed lines. Note that, since the main structure of the camera module 2 is the same as that of the above-described camera module 1 according to the first embodiment, the same components as those of the first embodiment have the same reference signs.

The differences of the camera module 2 according to the second embodiment from the camera module 1 according to the first embodiment are that the external dimensions of the imaging device 60, when viewed in a plane, are smaller than those of the first embodiment and the second spacer 80 is additionally provided as measures against this, and that the inside diameter of the first spacer 70 is set slightly smaller than the diameter of the opening 31 of the holder 30. Note that, in the camera module 2, the end surface 23 of the lens unit 20 is situated above the rim flange 32, just as with the above-described camera module 1 according to the first embodiment.

The second spacer 80 is made of urethane sponge having appropriate elasticity. Note that, the second spacer 80 may be made of any material as long as it can prevent contamination of dust, and for example, may be made of a rigid synthetic resin having no elasticity. Besides, for example, the second spacer 80 may be made of the acrylic gel, just as with the first spacer 70. In this case, a surface of the second spacer 80 that is opposed to the first spacer 70 is made into a slidable surface.

As illustrated in FIG. 6, the second spacer 80 is formed in the shape of a rectangular frame, and the internal opening dimensions of the second spacer 80 is slightly larger than the dimensions of the imaging device 60 viewed in a plane. As a result, the second spacer 80 surrounds the entire imaging device 60. The second spacer 80 has a bottom surface that is an adhesive surface the entire of which has a double-sided adhesive tape attached thereto. With the adhesive surface, the second spacer 80 is attached to the first printed wiring board 40 on the same side as the imaging device 60 is mounted. The second spacer 80 has approximately the same thickness as the imaging device 60. Thus, a top surface of the second spacer 80 is approximately coplanar to the light receiving surface 61 of the imaging device 60.

As illustrated in FIGS. 7A and 7B, the inside diameter of the first spacer 70 is set so as to surround the imaging field 62 of the imaging device 60. The entire imaging field 62 is exposed within the first spacer 70. However, since the imaging device 60 becomes smaller in contrast to the first embodiment, the inside diameter of the first spacer 70 is slightly larger than the external dimensions of the imaging device 60 viewed in a plane. The outside diameter of the first spacer 70 is set slightly larger than the external dimensions of the second spacer 80 viewed in a plane. The second surface 72 of the first spacer 70 is in contact with the light receiving surface 61 of the imaging device 60 and the top surface of the second spacer 80. Note that, the second surface 72 of the first spacer 70 is in contact with the top surface of the second spacer 80 at least throughout the entire circumference of the first spacer 70, but is not necessarily in contact with the entire surface of second surface 72 of the first spacer 70.

Just as with the first embodiment, the first spacer 70 is formed slightly thicker than the distance between the rim flange 32 and the light receiving surface 61 of the imaging device 60. The second surface 72 of the first spacer 70 is in contact with the light receiving surface 61 of the imaging device 60 and the top surface of the second spacer 80 with an elastic force that acts to try to return to an original shape from a compressed state. As a result, by tightly closing a space S that is formed by the lens unit 20, the inner peripheral wall of the opening 31, the first spacer 70, and the second spacer 80, it is possible to prevent dust from getting into the space S from the outside. Just as with the first embodiment, since the imaging field 62 of the imaging device 60 is disposed within the tightly closed space S, it is possible to avoid the adverse effects of contamination of the dust on imaging.

The second spacer 80 may be formed so as to have an arbitrary shape so that the second spacer 80 can surround the imaging device 60 and has approximately the same thickness as the imaging device 60 in accordance with the external dimensions of the imaging device 60 viewed in a plane. At this time, the second spacer 80 has to have such a shape that the second spacer 80 can surround the imaging device 60 and the second surface 72 of the first spacer 70 is continuously in contact with the top surface of the second spacer 80 at least throughout the entire circumference of the first spacer 70. Note that, the thickness of the second spacer 80 is arbitrarily settable as long as the second surface 72 of the first spacer 70 can be in contact with the second spacer 80 with an elastic force.

Also, as illustrated in FIG. 5B, in the camera module 2, since the inside diameter of the first spacer 70 is set slightly smaller than the diameter of the opening 31 of the holder 30, an inner circumferential part of the first spacer 70 protrudes inwardly in a radial direction of the opening 31 in the rim flange 32. The protruding part of the first spacer 70 into the opening 31 is an adhesive surface. Thus, not only the adhesive surface exposed in the inner peripheral wall of the first spacer 70 but also the protruding adhesive surface effectively catches dust that is produced inside the above-described tightly closed space S in the assembly process of the camera module 2 or dust that has already existed in the tightly closed space S.

Especially, when the thread portion 22 of the lens unit 20 is screwed into the opening 31 of the holder 30, if dust such as cutting scraps of the resin that could be produced by slidingly engaging the threads of the thread portion 22 with the threads of the opening 31 falls by its self-weight, the dust can be caught very effectively because the dust falls to the position of the adhesive surface. As a result, it is possible to avoid the adverse effects of the dust on imaging.

As described above, a simple structure is configured by taking advantage of the adhesive surface that the material of the first spacer 70 has as its properties to catch the dust, and therefore the camera module 2 can be assembled extremely easily, with eliminating the need for attaching a separate member such as a double-sided adhesive tape to catch the dust.

Furthermore, since the first spacer 70 made of the acrylic gel having the favorable thermal conductivity connects the light receiving surface 61 of the imaging device 60 to the holder 30 as a heat dissipation path, heat produced by the imaging device 60 is guided to the holder 30 through the first spacer 70. As a result, the heat produced by the imaging device 60 is dissipated from not only the first spacer 70 but also the holder 30, and thereby a high heat dissipation effect can be obtained. Note that, even if the imaging device 60 has small external dimensions, when viewed in a plane, and the second surface 72 of the first spacer 70 is not opposed to the light receiving surface 61 of the imaging device 60, making the second spacer 80 out of a material having favorable thermal conductivity provides a heat dissipation effect owing to a heat dissipation path from the second spacer 80 adjoining to the imaging device 60 through the first spacer 70.

Figure 8A:
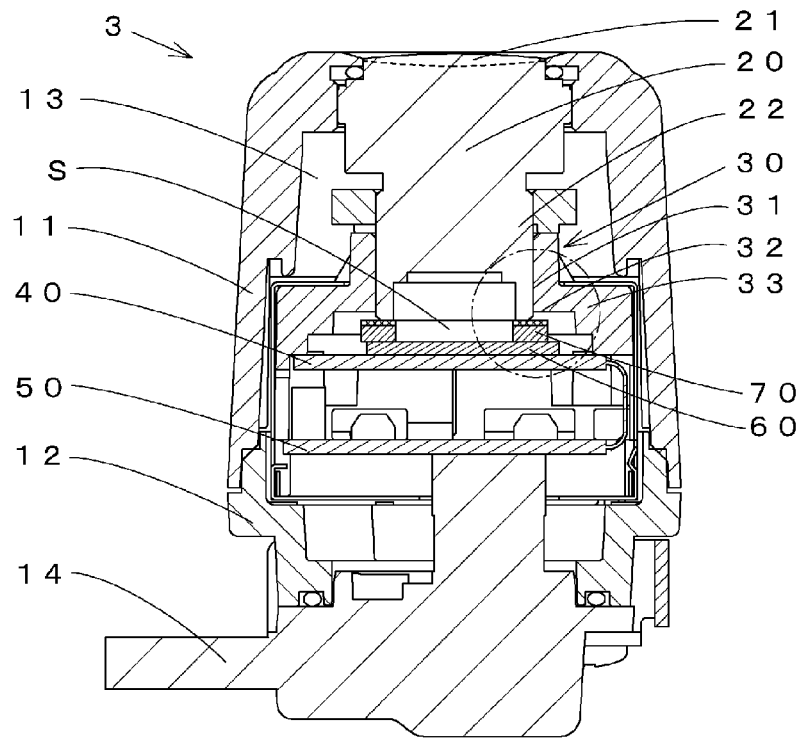
FIG. 8A is a cross-sectional view of a main part of a camera module according to a third embodiment of the present invention.
Figure 8B:
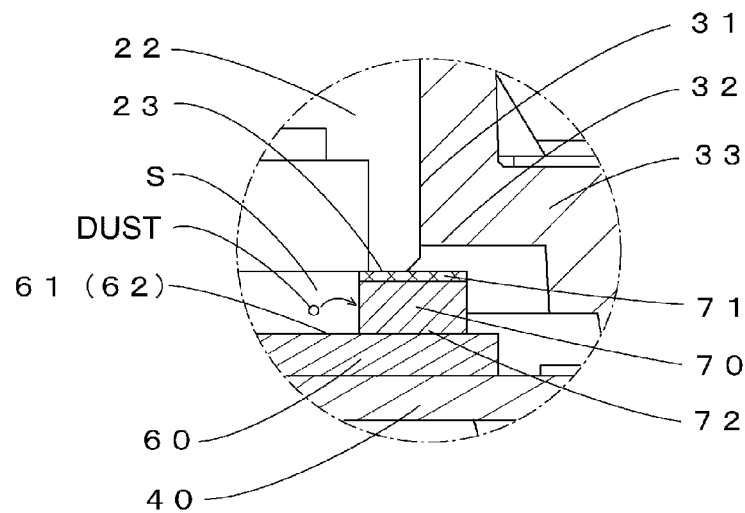
FIG. 8B is a cross-sectional view of a main part of a camera module according to the third embodiment of the present invention.
Figure 9:
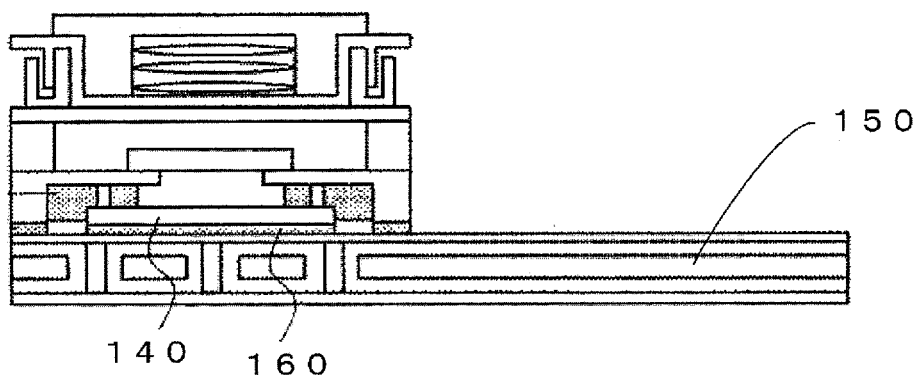
FIG. 9 is a drawing showing a conventional camera module.
Figure 10:
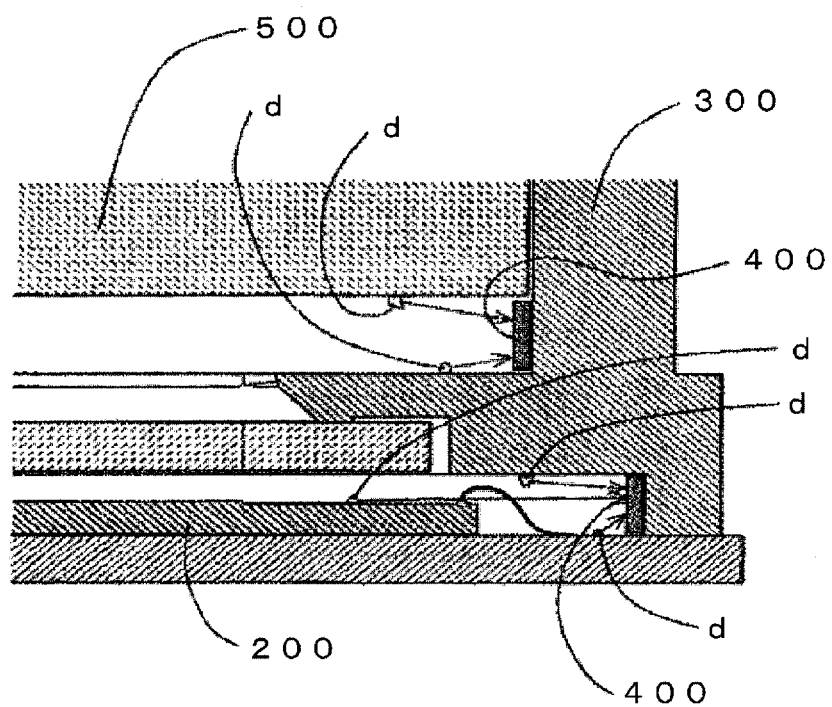
FIG. 10 is a drawing showing another conventional camera module.

A camera module 3 according to a third embodiment of the present invention will be described with the use of FIGS. 8A to 8B. FIGS. 8A and 8B are cross-sectional views of the camera module 3 according to the third embodiment at the same portion as the line A-A of the camera module 1 illustrated in FIG. 1. FIG. 8B is an enlarged view of a part of FIG. 8A surrounded by a circle indicated by alternate long and short dashed lines. Note that, since the main structure of the camera module 3 is the same as that of the above-described camera module 1 according to the first embodiment, the same components as those of the first embodiment have the same reference signs.

The difference of the camera module 3 according to the third embodiment from the camera module 1 according to the first embodiment is that, in contrast to the above-described camera module 1 according to the first embodiment and the camera module 2 according to the second embodiment, after the first spacer 70 is pasted onto the light receiving surface 61 of the imaging device 60 with the adhesive surface being the second surface 72 of the first spacer 70, the entire first surface 71 is made into a slidable surface by impairing the adhesion properties of the adhesive surface and is brought into contact with the entire circumference of the end surface 23 of the thread portion 22 of the lens unit 20 with an elastic force, as a measure against the end surface 23 of the lens unit 20 situated below the rim flange 32.

The first spacer 70 in the camera module 3 is made of the acrylic gel, just as with the camera module 1 according to the first embodiment, and is formed slightly thicker than the distance between the end surface 23 of the thread portion 22 of the lens unit 20 and the light receiving surface 61 of the imaging device 60. The first surface 71 of the first spacer 70 situated on the side of the opening 31 is made into the slidable surface the adhesion properties of which are impaired in the entire surface by the same technique as used in the camera module 1 according to the first embodiment. The first spacer 70 is pasted onto the light receiving surface 61 of the imaging device 60 with the second surface 72 being an adhesive surface.

In the state of attaching the first printed wiring board 40 to the holder 30, the first spacer 70 is elastically deformed and moderately compressed in a thickness direction. Shifting the lens unit 20 in the direction of the optical axis for focusing, by appropriately turning the lens unit 20, can vary the distance between the end surface 23 of the thread portion 22 and the light receiving surface 61, and the elastic deformation of the first spacer 70 can absorb this variation in the distance. Thus, the first surface 71 of the first spacer 70 is in contact with the end surface 23 of the lens unit 20 with an elastic force that acts to try to return to an original shape from the compressed state. As a result, since the space S that is formed by the lens unit 20, the first spacer 70, and the imaging device 60 is tightly closed, it is possible to prevent dust from getting into the space S from the outside. By disposing the imaging field 62 of the imaging device 60 within the tightly closed space S, it is possible to avoid the adverse effects of contamination of the dust on imaging.

As for the dust that may be produced from between the thread portion 22 and the opening 31, which is described in the camera module 2 according to the second embodiment, the thread portion 22 and the opening 31 are situated outside of the above-described tightly closed space S in the camera module 3 according to the third embodiment, and therefore the dust that may be produced from this portion cannot fall in the space S.

Also, as illustrated in FIG. 8B, since the adhesive surface exposed in the inner peripheral wall of the first spacer 70 effectively catches dust that is produced in the above-described tightly closed space S in the assembly process of the camera module 3 or dust that has already existed in the tightly closed space S, it is possible to avoid the adverse effects of the dust on imaging. As described above, a simple structure is configured by taking advantage of the adhesive surface that the material of the first spacer 70 has as its properties to catch the dust, and therefore the camera module 3 can be assembled extremely easily, with eliminating the need for attaching a separate member such as a double-sided adhesive tape to catch the dust.

Since the first surface 71 of the first spacer 70 is made into the slidable surface, the end surface 23 of the thread portion 22 smoothly slides on the first spacer 70 in the assembly process of the camera module 3, when the above-described optical axis alignment operation and the focusing operation by turning the lens unit 20 are performed after the first spacer 70 is pasted onto the light receiving surface 61. Thus, these operations are performed without any problem.

Furthermore, since the first spacer 70 made of the acrylic gel having the favorable thermal conductivity connects the imaging device 60 to the lens unit 20 as a heat dissipation path, heat produced by the imaging device 60 is guided to the lens unit 20 and the holder 30 through the first spacer 70. As a result, the heat produced by the imaging device 60 is dissipated from not only the first spacer 70 but also the lens unit 20 and the holder 30, and thereby a high heat dissipation effect can be obtained.

The embodiments of the present invention are suitably used as a camera module for vehicle perimeter monitoring, for example.

REFERENCE SIGNS LIST 1 camera module (first embodiment)
11 first case
12 second case
13 container unit
14 cable
S space
20 lens unit
21 objective lens
22 thread portion
23 end surface
30 holder
31 opening
32 rim flange
33 box unit
40 first printed wiring board
50 second printed wiring board
60 imaging device 61 light receiving surface
62 imaging field
70 first spacer
71 first surface
72 second surface
80 second spacer
2 camera module (second embodiment)
3 camera module (third embodiment)

The invention claimed is:

1. A camera module comprising:
a lens unit that has a cylindrical thread portion and an optical axis;
a flat plate-shaped imaging device that is mounted on a printed wiring board;
a holder that has a cylindrical opening that opens along the optical axis of the lens unit and engages with the thread portion, and holds the lens unit and the printed wiring board while maintaining a predetermined positional relationship between the lens unit and the printed wiring board; and
a first spacer that is formed into a ring shape made of an elastic material the surface of which is an adhesive surface, and has a first surface situated on a side of the opening and a second surface situated on a side of the imaging device, the first and second surfaces being parallel with a plane orthogonal to the optical axis of the lens unit and at least one of the first and second surfaces being made into a slidable surface by impairing adhesion properties of the adhesive surface, wherein
the imaging device has an imaging field thereof that is disposed in a space tightly closed by the first spacer between the holder and the printed wiring board, and the adhesive surface is exposed at least in an inner peripheral wall of the first spacer.

2. The camera module according to claim 1, wherein the first spacer is formed of a material that further has favorable thermal conductivity.

3. The camera module according to claim 1, wherein:
the holder has a rim flange continued from an open end of the opening on a side of the imaging device along a plane orthogonal to the optical axis of the lens unit;
the first surface is pasted onto the rim flange throughout the entire circumference with the adhesive surface; and
the entire surface of the second surface is made into a slidable surface by impairing adhesion properties of the adhesive surface.

4. The camera module according to claim 3, wherein the slidable surface is in contact with a light receiving surface of the imaging device with an elastic force throughout the entire circumference.

5. The camera module according to claim 3, further comprising a second spacer that is formed into a shape surrounding the imaging device, and wherein:
the second spacer is pasted onto a mount surface of the printed wiring board on which the imaging device is mounted;
the second spacer has a height from the mount surface of the printed wiring board to a surface opposed to the rim flange with the height being approximately the same as a height of the imaging device; and
the slidable surface is in contact with the second spacer with an elastic force throughout the entire circumference.

6. The camera module according to claim 3, wherein the first spacer has an inside diameter smaller than a diameter of the opening.

7. The camera module according to claim 1, wherein:
the first surface is made into a slidable surface in which adhesion properties of the adhesive surface are impaired throughout the entire surface;
the first surface is in contact with an end surface of the thread portion with an elastic force throughout the entire circumference; and
the second surface is pasted onto a light receiving surface of the imaging device with the adhesive surface throughout the entire circumference.

* * * * *